(12) United States Patent
Garrett et al.

(10) Patent No.: US 7,005,477 B1
(45) Date of Patent: Feb. 28, 2006

(54) MOISTURE-CURING POLYURETHANE MATERIAL HAVING A LONG GEL TIME

(75) Inventors: Thomas M. Garrett, Corona, CA (US); Xian Xian Du, Pittsburg, KS (US)

(73) Assignee: MCP Industries, Inc., Corona, CA (US)

( * ) Notice: Subject to any disclaimer, the term of this patent is extended or adjusted under 35 U.S.C. 154(b) by 0 days.

(21) Appl. No.: 10/150,182

(22) Filed: May 16, 2002

(51) Int. Cl.
*C08G 18/10* (2006.01)

(52) U.S. Cl. .................. 525/127; 525/130; 528/59; 528/67; 528/76; 528/77; 528/80; 528/83; 428/327; 428/423.9; 524/703; 524/871

(58) Field of Classification Search ............... 528/59, 528/76, 77, 80, 83; 428/327, 423.9; 525/127, 525/130
See application file for complete search history.

(56) References Cited

U.S. PATENT DOCUMENTS

| | | | |
|---|---|---|---|
| 3,272,098 A | 9/1966 | Buchholtz et al. | |
| 3,484,517 A | 12/1969 | Ligon et al. | |
| 3,583,945 A | 6/1971 | Robins | |
| 3,592,787 A | 7/1971 | Robins | |
| 4,420,513 A | 12/1983 | Coke et al. | |
| 4,532,316 A * | 7/1985 | Henn | |
| 4,614,686 A | 9/1986 | Coke et al. | |
| 4,788,083 A | 11/1988 | Dammann et al. | |
| 5,350,778 A * | 9/1994 | Steppan et al. | ............. 521/159 |
| 5,484,832 A | 1/1996 | Garrett et al. | |
| 5,587,448 A | 12/1996 | Engen | |
| 5,693,696 A | 12/1997 | Garrett et al. | |

FOREIGN PATENT DOCUMENTS

JP 58142836 * 8/1983

* cited by examiner

*Primary Examiner*—Rachel Gorr
(74) *Attorney, Agent, or Firm*—Crowell & Moring LLP

(57) ABSTRACT

A one component moisture-curing polyurethane adhesive composition having a long pot life that does not cause its user to experience breathing difficulty is described. In one embodiment the adhesive is prepared from a mixture of a high molecular weight component selected from the group consisting of polyols, diamines, and mixtures thereof; an isocyanate; and a low molecular weight component selected from the group consisting of diols, diamines, and mixtures thereof.

64 Claims, 2 Drawing Sheets

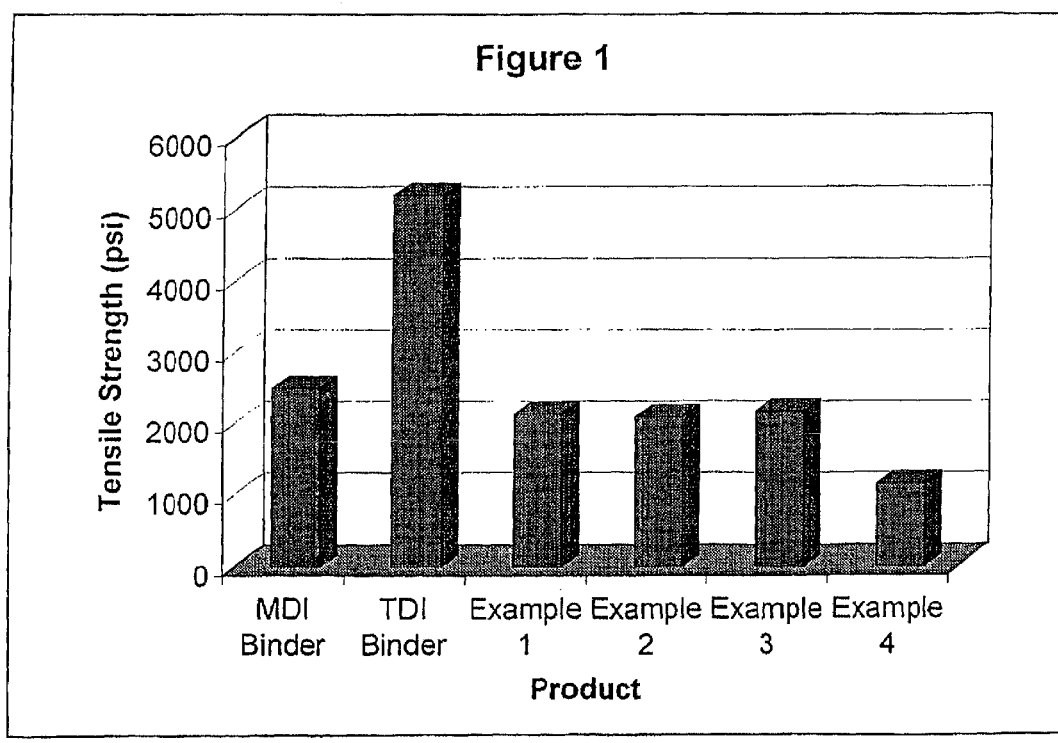

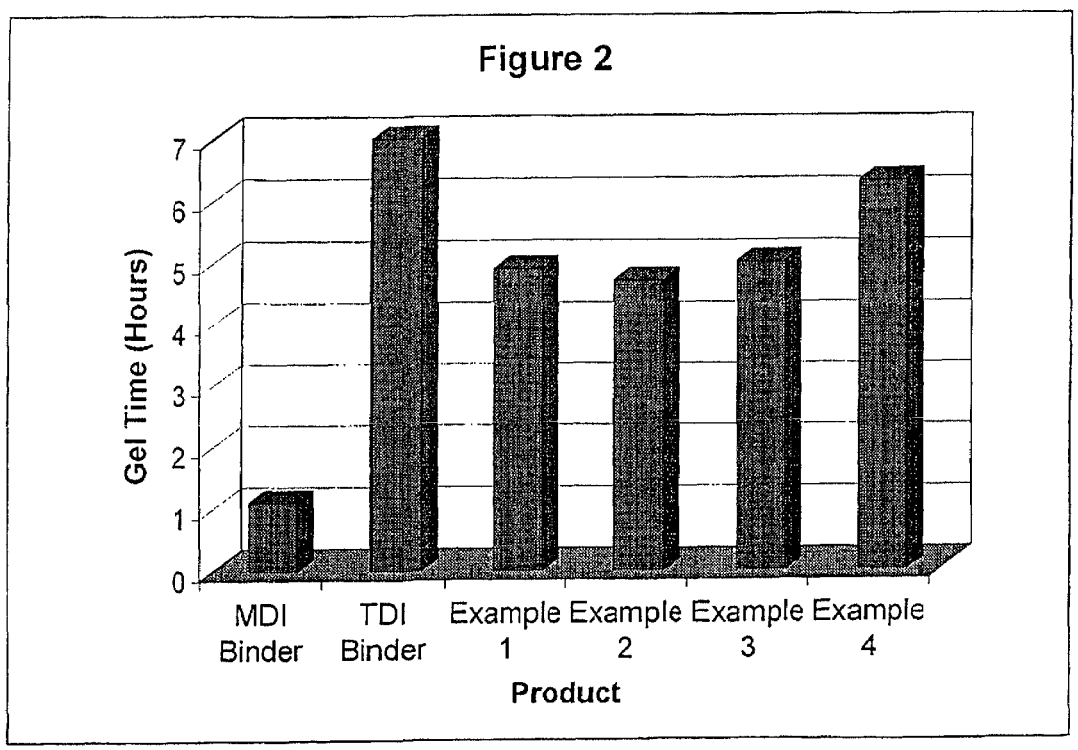

MOISTURE-CURING POLYURETHANE MATERIAL HAVING A LONG GEL TIME

FIELD OF THE INVENTION

The present invention relates to a novel one component polyurethane adhesive and binding material for rubber, plastic, wood, cork, glass or other materials.

BACKGROUND OF THE INVENTION

Athletic tracks are commonly surfaced with a mixture of a moisture-curing polyurethane binder and recycled rubber crumb. The selection of the components of the binder is influenced by several factors including the cost of the components, the physical properties of the binder, and the quality of the resulting product. Additionally, a polyurethane binder having volatile irritating components is objectionable to individuals who must use the material regularly.

Two formulations of a polyurethane binder are in common use: one containing methylene diphenyl diisocyanate (MDI), and another containing a mixture of toluene diisocyanate (TDI) and MDI. The moisture-curing one component adhesive binder that employs only MDI as the polyisocyanate component is inexpensive and safer to use than the TDI-containing binder. However, the commonly used MDI-only binder does not have a long pot life and typically gels in 1–1.2 hours. An adhesive's pot life is the length of time during which an adhesive remains suitable for use. A long pot life is important in applications such as athletic track surfacing because several hours may be required to apply the track material. Additionally, the material that is applied initially can be required to form a joint with the material that is applied last. Ideally, the joint between the material that is applied first and the material that is applied several hours later should be as seamless and aesthetically pleasing as possible. To prevent a seamed joint from forming that is undesirably susceptible to wear and potentially dangerous to the users of the track, the polyurethane material must not have completely cured before installation is complete. Adhesives with a long pot life, that are still workable when the final material is applied, form joints that are nearly, if not entirely, seamless. A long pot life provides a long working time to construct a resilient surface and creates a more seamless, aesthetically pleasing result.

The second commonly used moisture-curing one component polyurethane binder formulation, that employs TDI, is a popular choice in the athletic surfacing industry because the binder has a long pot life, typically 7 hours, and the resulting product demonstrates good physical properties. Unfortunately, because of the high vapor pressure of TDI, formulations containing TDI are unpleasant to work with. Health risks of an adhesive formulation containing TDI can include irritation of the nose and throat; choking and paroxysmal cough; chest pain and retrosternal soreness; nausea, vomiting, and abdominal pain; bronchial spasm; dyspnea, asthma, and pulmonary edema; and conjunctivitis and lacrimation (from the Merck Index, $12^{th}$ edition, 9668).

Both the currently used formulations, the TDI-containing and MDI-only polyurethane binders, use prepolymer mixtures having an excess of isocyanate groups. The TDI binders are obtained by reacting TDI and MDI with a polyol, typically a polyether or polyester polyol. The MDI-only binders are obtained from the reaction of a polyol with an excess of MDI. The TDI and MDI-only binders harden through reaction with atmospheric moisture.

SUMMARY OF THE INVENTION

One aspect of the present invention relates to one component moisture-curing polyurethane adhesives that have a long pot life but that do not necessarily employ TDI. Binders that do not employ TDI avoid the health risks associated with the use of TDI. The disclosed adhesives are useful in situations in which a polyurethane adhesive, binder, sealant, spray elastomer, or caulking material with a long pot life is desired. These moisture-curing adhesives are useful, for example, as binders for rubber crumb, plastic particles, cork particles, or glass fibers. A composite prepared from mixing rubber, cork, or resilient plastic crumb with the polyurethane binder can be used to create resilient surfaces for athletic activity, such as tracks, fields, playgrounds, or playstructures, or to create resilient molded structures having any size or shape. The adhesives of the current invention demonstrate good adhesion to a variety of substances, including rubber, plastic, glass, metal, asphalt, concrete, wood, and paper.

One embodiment of the invention employs a mixture of a chain extender, a high molecular weight polyol or diamine, and a polyisocyanate. It is common in the art to use chain extenders to increase the amount of the hard segment of the polyurethane block copolymer and thereby increase the physical properties of the resulting polymer (i.e., tensile, tear, and elongation). Chain extenders are particularly preferred for this application because the addition of chain extenders to a polymer formulation does not dramatically change other characteristics of the resulting polymer, such as viscosity, durometer, and gel time. In contrast to the general expectation of a polymer chemist, i.e., that the addition of a chain extender will not have an effect on or that a chain extender might even decrease pot life, it was found in the present invention that adding chain extenders to polyurethane adhesives produced adhesives with significantly longer pot lives.

BRIEF DESCRIPTION OF THE DRAWINGS

So that one skilled in the art to which the disclosed invention pertains will better understand the present invention, preferred embodiments will be described in detail below with reference to the drawings wherein:

FIG. 1 compares the measured tensile strength of thin film samples of the prior art MDI-only and TDI binders to the tensile strength of several binders made according to the examples described herein.

FIG. 2 compares the gel times of the prior art MDI-only and TDI binders to the gel times of several binders made according to the examples described herein. These gel times were measured at approximately 25° C. and about 50 to 80% humidity.

DETAILED DESCRIPTION OF VARIOUS EMBODIMENTS OF THE INVENTION

One aspect of the present invention provides a polyurethane material that is suitable for applications in which a long pot life is desired. In one embodiment, the present invention comprises an adhesive composition made from a mixture of about 50 to about 80% by weight of a high molecular weight component selected from the group consisting of polyols, diamines, and mixtures of polyols and diamines, about 19 to about 44% by weight of a polyisocyanate, and about 0.1 to about 3% by weight of a low molecular weight component selected from the group consisting of diols, diamines, and mixtures of diols and diamines. In general, the amount of high molecular weight component in the mixture as measured by parts per hundred, weight/weight, is about 50, preferably about 55, more preferably about 60, more preferably about 66, more preferably about 70, most preferably about 72, preferably about 74, preferably about 77, or about 80. The amount of polyisocyanate in the mixture as measured by parts per hundred, weight/weight, is about 19, preferably about 21, more preferably about 24, most preferably about 27, preferably about 30, preferably about 34, preferably about 38, or about 44. The amount of low molecular weight component as measured by parts per hundred, weight/weight, is about 0.1, preferably about 0.2, preferably about 0.3, preferably about 0.4, preferably about 0.5, preferably about 0.7, preferably about 0.8, preferably about 1, about 1.5, about 2, about 2.5, or about 3.

In one embodiment, the adhesive composition is made from a mixture of about 60 to about 80% by weight of a high molecular weight component selected from the group consisting of polyols, diamines, and mixtures of polyols and diamines; about 19 to about 38% by weight of a polyisocyanate, and about 0.1 to about 3% by weight of a low molecular weight component selected from the group consisting of diols, diamines, and mixtures of diols and diamines. In an additional embodiment the adhesive composition is made from a mixture of about 66 to about 77% by weight of a high molecular weight component selected from the group consisting of polyols, diamines, and mixtures of polyols and diamines; about 21 to about 33% by weight of a polyisocyanate, and about 0.1 to about 2% by weight of a low molecular weight component selected from the group consisting of diols, diamines, and mixtures of diols and diamines. In a further embodiment the adhesive composition is made from a mixture of about 70 to about 74% by weight of a high molecular weight component selected from the group consisting of polyols, diamines, and mixtures of polyols and diamines; about 24 to about 30% by weight of a polyisocyanate, and about 0.1 to about 1% by weight of a low molecular weight component selected from the group consisting of diols, diamines, and mixtures of diols and diamines.

In general, the high molecular weight polyols and diamines useful in the invention can have various polymeric backbones, such as polyether, polyester, or polybutadiene. These high molecular weight polyols and diamines typically have a molecular weight from about 1,000 to about 11,200, preferably from about 2,000 to about 9,000, more preferably from about 3,000 to about 8,000, and more preferably from about 4,000 to about 7,000. Typically, a high molecular weight diol suitable for the present invention will have a molecular weight of about 1,000 to about 6,000, a high molecular weight triol will have a molecular weight of about 3,000 to about 9,000, and a high molecular weight tetrol will have a molecular weight of about 4,000 to about 12,000. The molecular weight for the selected high molecular weight polyol or diamine is about 1,000, preferably about 2,000, more preferably about 2,500, more preferably about 3,000, more preferably about 3,500, most preferably about 4,000, preferably about 4,500, preferably about 5,000, preferably about 5,500, preferably about 6,000, preferably about 7,000, preferably about 8,000, preferably about 9,500, or about 11,200. The selected polyols will generally have a hydroxyl number from about 10 to about 112, preferably the hydroxyl number is from about 10 to about 56, and more preferably from about 14 to about 28. Typically, useful high molecular weight components will have a viscosity from about 140 to about 3,000, preferably from about 800 to about 2,800 and more preferably from about 1,500 to about 2,400 cP at 25° C. In a further preferred embodiment, the polyol is a diol. Suitable high molecular weight polyols include, among others, the following commercially available products: Poly-G® 20–28 (a hydroxyl terminated poly(oxyalkelyene polyol)) available from Arch Chemicals and Acclaim 2220, Acclaim 4220, PPG-1000, PPG-2000, and PPG-4000 available from Bayer. Some examples of suitable high molecular weight amines include, but are not limited to, the following commercially available products: the Jeffamines® available from the Huntsman Corporation, such as Jeffamine® T-403 (poly(oxy(methyl-1,2-ethanediyl),alpha-hydro-omega-(2-aminomethylethoxy)-, ether with 2-ethyl-2-(hydroxymethyl)-1,3-propanediol (3:1)) and Jeffamine® D-2000 (a polyoxypropylenediamine).

Suitable polyisocyanates include, for example, MDI, poly MDI, methylenebis(cyclohexyl) isocyanate (H12MDI), tetramethyl xylene diisocyanate (TMXDI), isophorone diisocyanate (IPDI), and mixtures thereof. Additionally, the selected polyisocyanate is a mixture of isomers. In one embodiment, the isocyanate is MDI. In a further embodiment the isocyanate is a mixture of 4,4'- and 2,4'-diphenylmethane diisocyanate, such as the following commercially available products: Mondur ML available from Bayer Co., Lupranate Mich. from BASF Co., or Rubinate 9433 from Huntsman. These commonly available formulations of MDI typically contain an approximately 50/50 mixture of the 2,4' and the 4,4' isomers of MDI, but mixtures having other ratios of these isomers are also appropriate for the invention as long as the mixture contains the 2,4' isomer. Suitable poly MDI's include Lupranate M10, Lupranate M20S, and Lupranate M70R, and Lupranate M200 available from BASF.

The low molecular weight polyols and diamines contemplated by the present invention can have various polymeric backbones, such as polyether, polyester, or polybutadiene. These polyols and diamines typically have a molecular weight less than about 400. In one embodiment, the molecular weight of the low molecular weight component is between about 60 and about 400, and more preferably between about 70 and about 325. In another embodiment, the molecular weight range is between about 80 and about 250, and in a further embodiment, the molecular weight range is between about 90 and about 190. In an additional embodiment, the molecular weight is about 134. The molecular weight of the low molecular weight polyol or diamine is about 60, preferably about 70, more preferably about 80, more preferably about 90, more preferably about 110, most preferably about 134, preferably about 150, preferably about 165, preferably about 180, preferably about 200, preferably about 250, preferably about 325, or about 400. In one embodiment, the low molecular weight component contains from about 2 to about 12 carbon atoms. In another embodiment, the low molecular weight component is a diol. Suitable low molecular weight diols include, for example, di(propylene glycol), 1,3-butanediol, 1,4-butanediol, 1,6-hexanediol, 2-ethyl-1,3-hexanediol, 2-butyl-2-ethyl-1,3-propanediol, 2,4-diethyl-1,5-pentanediol, neopentyl glycol, ethylene glycol, propylene glycol, di(ethylene glycol), and 2-methyl-1,3-propane diol (MP Diol). Suitable low molecular weight difunctional amines include, for example, hydrazine, ethylene diamine, 1,4-butane diamine, 1,6-hexane diamine, and the commercially available products: PC Amine DA 145, PC Amine DA 176, PC amine DA 221, PC Amine DA 250, and PC Amine DA 400, available from Nitroil® Performance Chemicals.

An adhesive formulation according to the invention can be obtained by a one step reaction of the polyisocyanate, the high molecular weight component, and the low molecular weight component. The polymerization reaction proceeds in atmospheric moisture without the addition of exogenous catalyst. In one embodiment, a formulation according to the present invention is obtained from a one step reaction. In another embodiment, a formulation according to the present invention is obtained from a two step reaction wherein a stoichiometric excess of the polyisocyanate reacts with the low molecular weight component first, and then the unreacted isocyanate is further reacted with the high molecular weight component. The reaction of the polyisocyanate and the low molecular weight component typically is allowed to proceed for about 0.2 to about 4 hours, and preferably is allowed to proceed for about 0.5 to about 1.5 hours. More preferably, a formulation according to the invention is obtained from a two step reaction wherein the high molecular weight component is allowed to react with the polyisocyanate first, forming an isocyano terminated prepolymer, and then this prepolymer is allowed to react with the low molecular weight component. The reaction of the polyisocyanate and the high molecular weight component typically occurs for about 1 to about 6 hours and preferably about 1.5 to about 3 hours. Polyurethane adhesives prepared according to the present invention generally have an isocyanate group content of about 4 to about 12%, preferably about 5 to about 10%, and more preferably about 7.5% by weight. The viscosity of the resulting adhesive is about 2,000 to about 5,000, preferably about 2,500 to about 3,500, and more preferably the viscosity is about 3,000 cP at 25° C. By varying the components of the adhesive mixture, adhesives can be obtained having pot lives of up to about 16 or even up to about 24 hours or more at 25° C. and about 40% humidity. Pot life depends on temperature and humidity such that lower temperature and/or humidity increases pot life. FIG. 2 shows several gel times that were achieved with adhesives according to the present invention at 25° C. Gel time is an approximate measure of pot life. In some instances gel time will be longer than pot life and in other instances pot life may be longer than gel time. The selection of an adhesive according to its pot life is a user-defined variable and will depend upon an individual user's preferences and the particular application of the adhesive. Adhesives according to the present invention can be formulated to exhibit pot lives of greater than about 1.5 hours, or more desirably greater than about 2 hours, or more desirably between about 2 and about 16 hours, or more desirably between about 3 and about 10 hours at 25° C. and 50 to 80% humidity. For example, a pot life of between about 4 to about 7 hours at 25° C. and 50 to 80% humidity is desirable in the athletic track surfacing industry.

In one embodiment, the binders of the present invention are mixed with recycled rubber crumb to create a resilient surfacing material. The rubber that is mixed with a binder formulation according to the present invention may have any size, but in one embodiment is recycled rubber crumb (such as that from recycled tires) having a crumb size from about 0.3 to about 4.5 mm. The selection of crumb size typically depends on aesthetic and other concerns such as the price of the material and the ease of working with the resulting composite. A suitable composite of binder and rubber crumb will contain about 70 to about 95 by weight of rubber crumb and about 5 to about 30% by weight per hundred of adhesive binder. In another embodiment, a mixture of the binder and rubber crumb contains about 80 to about 90% by weight of the rubber crumb and about 10 to about 20% by weight of adhesive binder. Other materials can be substituted for the rubber crumb to make a composite for various applications, such as particles of plastic, wood, or cork, or glass fibers. After a composite, such as that of rubber crumb and adhesive, is applied or shaped as desired, the mixture hardens over time through reaction with atmospheric moisture. The mixture hardens faster at higher temperature and/or higher dew point. It is believed that hardening occurs by the hydrolysis of free isocyanate groups to create amino groups which then react with the remaining isocyanate groups to form polyurethaneurea.

The following examples are provided to further illustrate several embodiments of the invention. These examples are not meant to limit the scope of the invention.

EXAMPLE 1

A resilient surface was prepared from a mixture of rubber crumb and binder. The binder was prepared by mixing 698 parts by weight, e.g., grams, of a polyether polyol (a diol having a molecular weight of 4,000 (PPG-4000 available from Bayer)), with 7 parts by weight of di(propylene glycol), and 295 parts by weight of MDI (a 50/50 mixture by weight of 4,4'-diphenylmethane diisocyanate and 2,4'-diphenylmethane diisocyanate). The binder components were stirred for two hours at 80° C. to give a polyurethane pre-polymer as a colorless oil. The resulting pre-polymer binder had an isocyano (NCO) content of 8.0% by weight, a viscosity of 2,700 cP at 27° C. and a gel time of 4.9 hours at 25° C., 20.5° C. dewpoint, and 77% humidity. The cured film of the binder had a tensile strength of 2,121 psi and an elongation of 622%.

A mixture was made of 200 g of the pre-polymer binder and 800 g of recycled rubber crumb having a grain size from 1 to 3 mm. The mixture was stirred until the rubber crumbs were completely wetted with binder and then was poured into a 48×30×2 cm pan. The mixture was shaped with a roller to a uniform thickness of 9.5 to 10.5 mm. The resulting rubber sheet was cured for 7 days at room temperature in the presence of atmospheric moisture. This composite was found to have good physical properties.

EXAMPLE 2

An adhesive binder was prepared by stirring 7 parts by weight of di(propylene glycol) with 295 parts by weight of MDI (a 50/50 by weight mixture of 4,4'-diphenylmethane diisocyanate and 2,4'-diphenylmethane diisocyanate) for one hour at 35–55° C. A polyether polyol (a diol having a molecular weight of 4,000 (PPG-4000 available from Bayer)), 698 parts by weight, was then added and the mixture was stirred for two additional hours at 80° C. The resulting polyurethane binder was a colorless oil with a NCO content of 8.0% by weight, a viscosity of 2,800 cP at 26° C., and a gel time of 4.7 hours at 25° C., 22° C. dewpoint, and 84% humidity. The cured film of the polyurethane binder had a tensile strength of 2,080 psi and an elongation of 630%.

A mixture was made of 200 g of the polyurethane binder and 800 g of recycled rubber crumb having a grain size of 1 to 3 mm. The mixture was stirred until the rubber crumbs were completely wetted with binder and then about half of the mixture was poured into a 48×30×2 cm pan. The binder and rubber crumb mixture in the pan was shaped with a roller into a mat having a uniform thickness of 9.5 to 10.5 cm and allowed to cure for 6 hours at room temperature. The remainder of the rubber mixture was then poured next to the first mat and shaped with a roller to a uniform thickness of 9.5 to 10.5 cm. After curing for 7 days at room temperature in the presence of atmospheric moisture, the two rubber mats were found to have formed a seamless joint.

EXAMPLE 3

An adhesive binder was prepared by mixing 698 parts by weight of a polyether polyol (a diol with a molecular weight of 4,000 (PPG-4000 available from Bayer)), 295 parts by weight of MDI (a 50/50 mixture by weight of 4,4'-diphenylmethane diisocyanate and 2,4'-diphenylmethane diisocyanate). This mixture was stirred for two hours at 80° C. and cooled to 65° C. Seven parts by weight of di(propylene glycol) were then added and this mixture was stirred for one hour at about 40 to 65° C. The resulting polyurethane binder was obtained as a colorless oil and has a NCO content of 8.0% by weight, a viscosity of 3,200 cP at 25° C., and a gel time of 5 hours at 25° C., 18° C. dewpoint, and 64% humidity. A cured film of the binder had a tensile strength of 2,160 psi and an elongation of 590%.

A mixture was made of 200 g of the polyurethane binder and 800 g of recycled rubber crumb having a grain size of 1 to 3 mm and the mixture was stirred until the rubber crumbs were completely wetted with binder. About half of the mixture was poured into a 48×30×2 cm pan. The binder and rubber crumb mixture in the pan was shaped with a roller into a mat having a uniform thickness of 9.5 to 10.5 cm and allowed to cure for 4 hours at 30–36° C. in the sunlight. The remainder of the rubber mixture was then poured next to the first mat and shaped with a roller to a uniform thickness of 9.5 to 10.5 cm. After curing for 7 days outdoors at 24 to 38° C. in the presence of atmospheric moisture, the two rubber mats were found to formed a joint without a discernable seam.

EXAMPLE 4

An adhesive binder was prepared by mixing 762 parts by weight of a polyether polyol (a diol having a molecular weight of 4,000 (PPG-4000 available from Bayer)), with 10 parts by weight of di(propylene glycol), and 228 parts by weight of MDI (a 50/50 mixture by weight of 4,4'-diphenylmethane diisocyalnate and 2,4'-diphenylmethane diisocyanate). The binder components were stirred for two hours at 80° C. to give a polyurethane pre-polymer as a colorless oil. The resulting pre-polymer binder had a NCO content of 5.4% by weight, a viscosity of 2,600 cP at 28° C. and a gel time of 6.3 hours at 25° C., 18° C. dewpoint, and 64% humidity. A cured film of the binder had a tensile strength of 1,148 psi and an elongation of 542%.

A mixture was made of 200 g of the polyurethane binder and 800 g of recycled rubber crumb having a grain size of 1 to 3 mm and the mixture was stirred until the rubber crumbs were completely wetted with binder. About half of the mixture was poured into a 48×30×2 cm pan. The binder and rubber crumb mixture in the pan was shaped with a roller into a mat having a uniform thickness of 9.5 to 10.5 cm and allowed to cure for 6 hours at room temperature. The remainder of the rubber mixture was then poured next to the first mat and shaped with a roller to a uniform thickness of 9.5 to 10.5 cm. After curing for 7 days at room temperature in the presence of atmospheric moisture, the two rubber mats were found to be joined together without a discernable seam.

FIG. 1 compares measurements of the tensile strength of films of the prior art binders to the measured tensile strengths of thin films of the binders prepared according the examples given above. FIG. 2 compares the gel times for the MDI binder and TDI-containing binder to the gel times measured for the binders prepared according to the examples given above. Gel times in these examples were measured at approximately 25° C. and about 50 to about 80% humidity. Measurements were made under this temperature and humidity because these conditions approximate typical conditions found outdoors in the summertime, but the binders of the present invention can also be used at other temperatures and humidities. It can be seen from FIG. 2 that the addition of the chain extender significantly increases the gel time over the gel time observed for the MDI-only binder. Composites of binder and rubber prepared from binders formulated according to the present invention exhibit good physical properties such as good values for tensile strength and elongation.

It will be understood that the various modifications may be made to the embodiments disclosed herein. For example, the disclosed formula could be made using many different polyisocyanates and could be used wherever a moisture-curing polyurethane adhesive with a long pot life is desired. Therefore, the above description should not be construed as limiting, but merely as examples of some of the preferred embodiments.

What is claimed is:

1. A composition obtained by mixing:
   a moisture-curing adhesive polyurethane composition having a pot life of about 3 to 10 hours at 25° C. and 50 to 80% humidity, the adhesive composition comprising a high molecular weight component selected from the group consisting of polyols, diamines, and mixtures thereof; a low molecular weight component selected from the group consisting of diols, diamines, and mixtures thereof; and a polyisocyanate selected from the group consisting of MDI and polyMDI; and
   at least one of cork, rubber and plastic.

2. The composition of claim 1, wherein said adhesive composition comprises a mixture of a high molecular weight polyol, a low molecular weight diol, and MDI.

3. The composition of claim 1, wherein the pot life of the adhesive is about 4 to about 7 hours at 25° C. and 50 to 80% humidity.

4. A composite obtained by mixing:
   an adhesive composition having a pot life of greater than about 1.5 hours at 25° C. and 50 to 80% humidity, wherein the adhesive composition comprises:
   a) about 50 to about 80% by weight of a high molecular weight component selected from the group consisting of polyols, diamines, and mixtures of polyols and diamines,
   b) about 19 to about 44% by weight of a polyisocyanate selected from the group consisting of MDI and polyMDI, and
   c) about 0.1 to about 3% by weight of a low molecular weight component selected from the group consisting of diols, diamines, and
   mixtures of diols and diamines; and
   a component selected from the group consisting of rubber crumb, cork particles, plastic particles, glass fibers, and mixtures thereof.

5. The composite according to claim 4 wherein the high molecular weight component has a molecular weight from about 1,000 to about 11,200.

6. The composite according to claim 4 wherein the high molecular weight component has a molecular weight from about 2,000 to about 9,000.

7. The composite according to claim 4 wherein the high molecular weight component has a molecular weight from about 3,000 to about 8,000.

8. The composite according to claim 4 wherein the high molecular weight component has a molecular weight from about 4,000 to about 7,000.

9. The composite according to claim 4 wherein the adhesive composition has an isocyanate group content of about 4 to about 12% by weight.

10. The composite according to claim 4 wherein the adhesive composition has an isocyanate group content of about 5 to about 10% by weight.

11. The composite according to claim 4 wherein the low molecular weight component is a diol containing from about 2 to about 12 carbon atoms.

12. The composite according to claim 4 wherein the low molecular weight component is a diol containing from about 2 to about 8 carbon atoms.

13. The composite according to claim 4 wherein the low molecular weight component has a molecular weight from about 60 to about 400.

14. The composite according to claim 4 wherein the low molecular component has a molecular weight from about 70 to about 325.

15. The composite according to claim 4 wherein the low molecular component has a molecular weight from about 80 to about 250.

16. The composite according to claim 4 wherein the low molecular weight component is a diol selected from the group consisting of di(propylene glycol), 1,3-butanediol, 1,4-butanediol, 1,6-hexanediol, 2-ethyl-1,3-hexanediol, 2-butyl-2-ethyl-1,3-propanediol, 2,4-diethyl-1,5-pentanediol, di(ethylene glycol), neopentyl glycol, ethylene glycol, propylene glycol, 2-methyl-1,3-propane diol, and mixtures thereof.

17. The composite according to claim 16 wherein the polyisocyanate is MDI.

18. The composite according to claim 4 wherein the pot life of the adhesive is about 2 to about 16 hours.

19. The composite according to claim 4 wherein the pot life of the adhesive is about 3 to about 10 hours.

20. The composite according to claim 16 wherein the pot life of the adhesive is about 3 to about 10 hours.

21. The composite according to claim 4 formed by mixing said adhesive composition with about 70 to about 95 parts of rubber crumb and about 5 to about 30% by weight of resin.

22. The composite according to claim 4 wherein the adhesive composition contains about 60 to about 80% by weight of the high molecular weight component, about 19 to about 38% by weight of a polyisocyanate; and about 0.1 to about 3% by weight of a low molecular weight component.

23. The composite according to claim 22 wherein the low molecular weight component is a diol selected from the group consisting of di(propylene glycol), 1,3-butanediol, 1,4-butanediol, 1,6-hexanediol, 2-ethyl-1,3-hexanediol, 2-butyl-2-ethyl-1,3-propanediol, 2,4-diethyl-1,5-pentanediol, di(ethylene glycol), neopentyl glycol, ethylene glycol, propylene glycol, 2-methyl-1,3-propane diol, and mixtures thereof.

24. The composite according to claim 23 wherein the pot life of the adhesive is about 3 to about 10 hours.

25. A composite obtained by mixing:
an adhesive composition having a pot life of greater than about 1.5 hours at 25° C. and 50 to 80% humidity, wherein the adhesive composition comprises a) about 66 to about 77% by weight of a high molecular weight component selected from the group consisting of polyols, diamines, and mixtures of polyols and diamines, b) about 21 to about 33% by weight of a polyisocyanate that is not TDI, and c) about 0.1 to about 2% by weight of a low molecular weight component selected from the group consisting of diols, diamines, and mixtures of diols and diamines; and a component selected from the group consisting of rubber crumb, cork particles, plastic particles, glass fibers, and mixtures thereof.

26. The composite according to claim 25 wherein the adhesive composition has an isocyanate group content of about 4 to about 12% by weight.

27. The composite according to claim 25 wherein the adhesive composition has an isocyanate group content of about 5 to about 10% by weight.

28. The composite according to claim 25 wherein the low molecular weight component is a diol containing from about 2 to about 12 carbon atoms.

29. The composite according to claim 25 wherein the low molecular weight component is a diol containing from about 2 to about 8 carbon atoms.

30. The composite according to claim 25 wherein the low molecular weight component has a molecular weight from about 60 to about 400.

31. The composite according to claim 25 wherein the low molecular component has a molecular weight from about 70 to about 325.

32. The composite according to claim 25 wherein the low molecular component has a molecular weight from about 80 to about 250.

33. The composite according to claim 25 wherein the low molecular weight component is a diol selected from the group consisting of di(propylene glycol), 1,3-butanediol, 1,4-butanediol, 1,6-hexanediol, 2-ethyl-1,3-hexanediol, 2-butyl-2-ethyl-1,3-propanediol, 2,4-diethyl-1,5-pentanediol, di(ethylene glycol), neopentyl glycol, ethylene glycol, propylene glycol, 2-methyl-1,3-propane diol, and mixtures thereof, and wherein the polyisocyanate is selected from the group consisting of MDI, poly MDI, TMXDI, H12MDI, IPDI, and mixtures thereof.

34. The composite according to claim 33 wherein the polyisocyanate is MDI.

35. The composite according to claim 25 wherein the high molecular weight component has a molecular weight from about 1,000 to about 11,200.

36. The composite according to claim 25 wherein the high molecular weight component has a molecular weight from about 2,000 to about 9,000.

37. The composite according to claim 25 wherein the high molecular weight component has a molecular weight from about 3,000 to about 8,000.

38. The composite according to claim 25 wherein the high molecular weight component has a molecular weight from about 4,000 to about 7,000.

39. The composite according to claim 25 wherein the pot life of the adhesive is about 3 to about 10 hours.

40. The composite according to claim 25 mixed with about 70 to about 95 parts of rubber crumb.

41. A composite prepared from mixing an adhesive composition having a pot life of about 2 hours to about 10 hours at 25° C. and 50 to 80% humidity, wherein the adhesive composition comprises a) about 50 to about 80% by weight of a high molecular weight polyol,
b) about 19 to about 44% by weight of a polyisocyanate selected from the group consisting of MDI and polyMDI, and
c) about 0.1 to about 3% by weight of a low molecular weight diol; and
a component selected from the group consisting of rubber crumb, cork particles, plastic particles, glass fibers, and mixtures thereof.

42. The composite according to claim 41 wherein the adhesive composition has an isocyanate group content of about 4 to about 12% by weight.

43. The composite according to claim 41 wherein the adhesive composition has an isocyanate group content of about 5 to about 10% by weight.

44. The composite according to claim 41 wherein the low molecular weight diol has about 2 to about 12 carbon atoms.

45. The composite according to claim 41 wherein the low molecular weight diol has about 2 to about 8 carbon atoms.

46. The composite according to claim 41 wherein the low molecular weight diol has a molecular weight from about 60 to about 400.

47. The composite according to claim 41 wherein the low molecular diol has a molecular weight from about 70 to about 325.

48. The composite according to claim 41 wherein the low molecular diol has a molecular weight from about 80 to about 250.

49. The composite according to claim 41 wherein the low molecular weight component is a diol selected from the group consisting of di(propylene glycol), 1,3-butanediol, 1,4-butanediol, 1,6-hexanediol, 2-ethyl-1,3-hexanediol, 2-butyl-2-ethyl-1,3-propanediol, 2,4-diethyl-1,5-pentanediol, di(ethylene glycol), neopentyl glycol, ethylene glycol, propylene glycol, 2-methyl-1,3-propane diol, and mixtures thereof.

50. The composite according to claim 49 wherein the polyisocyanate is MDI.

51. The composite according to claim 41 wherein the high molecular weight polyol has a molecular weight from about 1,000 to about 11,200.

52. The composite according to claim 41 wherein the high molecular weight polyol has a molecular weight from about 2,000 to about 9,000.

53. The composite according to claim 41 wherein the high molecular weight polyol has a molecular weight from about 3,000 to about 8,000.

54. The composite according to claim 41 wherein the high molecular weight polyol has a molecular weight from about 4,000 to about 7,000.

55. The composite according to claim 41 prepared from mixing the adhesive composition with about 70 to about 95% by weight of rubber crumb.

56. The composite according to claim 41 wherein the adhesive composition contains about 60 to about 80% by weight of the high molecular weight polyol, about 19 to about 38% by weight of the polyisocyanate; and about 0.1 to about 3% by weight of a low molecular weight diol.

57. The composite according to claim 41 wherein the adhesive composition contains about 66 to about 77% by weight of the high molecular weight polyol, about 21 to about 33% by weight of the polyisocyanate; and about 0.1 to about 2% by weight of a low molecular weight diol.

58. The composite according to claim 41 wherein the pot life of the adhesive is about 2 to about 16 hours.

59. The composite according to claim 41 wherein the pot life of the adhesive is about 3 to about 10 hours.

60. A surface covered with a resilient surfacing material comprising a composite of:
a) about 5 to 30% by weight of a binder having a pot life of greater than about 2 hours at 25° C. and 50 to 80% humidity prepared from about 50 to about 80% by weight of a high molecular weight polyol; about 19 to about 44% by weight of a polyisocyanate selected from the group consisting of MDI and polyMDI; and about 0.1 to about 3% by weight of low molecular weight diol; and
b) about 70 to about 95% by weight of rubber particles.

61. The resilient surfacing material according to claim 60 wherein the composite has about 80 to about 90% by weight of rubber particles.

62. A composite obtained by mixing:
about 5 to about 30 parts of an adhesive composition having a pot life of about 3 to about 10 hours at 25° C. and 50 to 80% humidity, wherein the adhesive composition comprises
a) about 50 to about 80% by weight of a high molecular weight polyol,
b) about 19 to about 44% by weight of MDI, and
c) about 0.1 to about 3% by weight of a low molecular weight diol; with
about 70 to about 95% by weight of rubber crumb.

63. A composite according to claim 62 wherein the adhesive composition contains about 60 to about 80% by weight of the high molecular weight polyol, about 19 to about 38% by weight of MDI; and about 0.1 to about 3% by weight of the low molecular weight diol.

64. A surface to be used for athletic activity upon which a layer of the composite of claim 62 has been applied.

* * * * *